US012209157B2

(12) United States Patent
Schlumpf et al.

(10) Patent No.: US 12,209,157 B2
(45) Date of Patent: Jan. 28, 2025

(54) POLYURETHANE COMPOSITION HAVING A LOW CONTENT OF MONOMERIC DIISOCYANTES

(71) Applicant: SIKA TECHNOLOGY AG, Baar (CH)

(72) Inventors: Michael Schlumpf, Stallikon (CH); Sven Reimann, Zürich (CH); Berzad Durmic, Zufikon (CH)

(73) Assignee: SIKA TECHNOLOGY AG, Baar (CH)

( * ) Notice: Subject to any disclaimer, the term of this patent is extended or adjusted under 35 U.S.C. 154(b) by 645 days.

(21) Appl. No.: 17/266,659

(22) PCT Filed: Aug. 5, 2019

(86) PCT No.: PCT/EP2019/071050
§ 371 (c)(1),
(2) Date: Feb. 8, 2021

(87) PCT Pub. No.: WO2020/030607
PCT Pub. Date: Feb. 13, 2020

(65) Prior Publication Data
US 2021/0309787 A1  Oct. 7, 2021

(30) Foreign Application Priority Data
Aug. 8, 2018 (EP) ..................... 18187904

(51) Int. Cl.
*C08G 18/30* (2006.01)
*C08G 18/10* (2006.01)
*C08G 18/32* (2006.01)
*C08G 18/48* (2006.01)

(52) U.S. Cl.
CPC ........... *C08G 18/10* (2013.01); *C08G 18/307* (2013.01); *C08G 18/3256* (2013.01); *C08G 18/4841* (2013.01); *C08G 2190/00* (2013.01)

(58) Field of Classification Search
CPC ... C08G 18/10; C08G 18/307; C08G 18/4841
See application file for complete search history.

(56) References Cited

U.S. PATENT DOCUMENTS

| 4,906,720 A | * | 3/1990 | Parfondry | ............ | C08G 18/797 |
| | | | | | 528/68 |
| 5,726,272 A | * | 3/1998 | Yonek | .................... | C08G 18/10 |
| | | | | | 528/60 |
| 5,955,199 A | * | 9/1999 | Johnson | ............. | C08G 18/0885 |
| | | | | | 428/423.1 |
| 7,625,993 B2 | | 12/2009 | Burckhardt | | |
| 8,252,859 B2 | | 8/2012 | Burckhardt | | |
| 2003/0024639 A1 | * | 2/2003 | Paulsen | .................. | C09J 175/08 |
| | | | | | 156/331.7 |
| 2009/0202837 A1 | | 8/2009 | Onuoha et al. | | |
| 2010/0101455 A1 | * | 4/2010 | Burckhardt | ........ | C08G 18/4812 |
| | | | | | 528/68 |

FOREIGN PATENT DOCUMENTS

| EP | 1746117 A1 * | 1/2007 | ............. C08G 18/10 |
| EP | 2439219 A1 | 4/2012 | |
| WO | 2007/104761 A1 | 9/2007 | |
| WO | 2017/108834 A1 | 6/2017 | |

OTHER PUBLICATIONS

EP-1746117_01-2007_English Translation.*
Oct. 15, 2019 English Translation of the International Preliminary Report on Patentability issued in International Patent Application No. PCT/EP2019/071050.
Feb. 18, 2021 English Translation of the International Preliminary Report on Patentability issued in International Patent Application No. PCT/EP2019/071050.

* cited by examiner

*Primary Examiner* — Michael L Leonard
(74) *Attorney, Agent, or Firm* — Oliff PLC

(57) ABSTRACT

A blocked amine as curing aid for polymers containing isocyanate groups and having a low monomeric diisocyanate content, obtained from the reaction of at least one monomeric diisocyanate with at least one polyol in an NCO/OH ratio of at least ¾, followed by removal of a majority of the monomeric diisocyanates by means of a suitable separation method, and to the moisture-curing polyurethane compositions obtained from this use. The use enables storage-stable, moisture-curing polyurethane compositions which can be safely handled even without special safety precautions and can be sold without hazard labeling in many countries, have good processibility and cure reliably and rapidly at ambient temperatures to give a material of high strength, elasticity and extensibility, and high stability to weathering influences. Such moisture-curing polyurethane compositions are particularly suitable as elastic sealants, adhesives or coatings, especially also for exposed outdoor applications.

20 Claims, No Drawings

POLYURETHANE COMPOSITION HAVING A LOW CONTENT OF MONOMERIC DIISOCYANTES

TECHNICAL FIELD

The invention relates to moisture-curing polyurethane compositions and to the use thereof as elastic adhesives, sealants and coatings.

STATE OF THE ART

Polyurethane compositions which crosslink through reaction of isocyanate groups with moisture or water and cure to give elastomers are especially used as elastic adhesives, sealants or coatings in the construction and manufacturing industry, for example for bonding of components in assembly, for filling joints, as floor coating or as roof seal. Owing to their good adhesion and elasticity, they can gently damp and buffer forces acting on the substrates, triggered for instance by vibrations or variations in temperature.

Such polyurethane compositions contain polymers containing isocyanate groups as binders, which are prepared by reacting polyols with monomeric diisocyanates. The polymers thus obtained, on account of chain extension reactions, contain a residual monomeric diisocyanate content, typically in the range from 1% to 3% by weight. Monomeric diisocyanates are potentially harmful to health. Formulations containing monomeric diisocyanates, in particular above a concentration of 0.1% by weight, must be provided with hazard symbols and warning messages on the label and in the data sheets, and in some countries may be subject to regulations in respect of sale and use. There are various approaches to polymers containing isocyanate groups with a low monomeric diisocyanate content. One route is to use the monomeric diisocyanate in deficiency in the preparation of the polymer. However, this gives rise to highly chain-extended polymers having very high viscosity that lead to problems with storage stability and processibility of the products.

A further route is to partly react the polymer containing isocyanate groups with a functional compound, for example a mercaptosilane, aminosilane or hydroxyaldimine. The reaction products obtained, however, have different crosslinking characteristics and greatly elevated viscosity, and likewise have only limited storage stability and processibility.

EP 2,439,219 describes the use of silicon dioxide having surface amino groups for reduction of the monomeric diisocyanate content. However, the specific silicon dioxide is costly and likewise leads to high viscosities.

In terms of product properties, the most attractive route to polymers containing isocyanate groups that have a low monomeric diisocyanate content is to use the monomeric diisocyanate in excess in the preparation of the polymer and then to remove the majority of the unconverted monomeric diisocyanate by means of a suitable separation method, especially by means of distillation. Polymers from this process have comparatively low viscosity and a low residual monomeric diisocyanate content, and are of excellent suitability for production of polyurethane compositions having a low monomer level which have good storage stability and good application properties. However, polymers prepared by this route also show disadvantages in compositions, especially on curing. Compared to conventional polymers, they typically cure more slowly with moisture, which can lead to retarded development of strength and a surface that remains tacky for a long time. This is the case to a particularly marked degree for polymers based on sterically hindered and/or aliphatic diisocyanates such as tolylene diisocyanate or isophorone diisocyanate. Particularly polymers based on isophorone diisocyanate that have a low monomer level show particularly poor curing characteristics in polyurethane compositions; even with large amounts of catalyst, they cure only gradually at ambient temperature, have a highly tacky surface and are not very stable, especially to heat, owing to the high catalyst content. But such polymers having a low monomer level, on account of their high stability to weathering influences, would be very attractive in elastic sealants, adhesives and coatings for exposed outdoor applications, for example on roofs, on façades of high-rise buildings or in the marine sector, especially for the joining of ships decks. For that purpose, however, they must cure rapidly and without significant residual tack and may contain small amounts at most of toxic catalysts that lower the stability of the cured polymer. Moreover, polymers having a low monomer level based on very reactive diisocyanates, such as diphenylmethane diisocyanate in particular, show weaknesses in storage stability.

EP 1,746,117 describes a process for preparing prepolymers containing isocyanate groups. In examples 1 and 3, NCO prepolymers with a low monomer level are prepared from the reaction of diphenylmethane 4,4-diisocyanate and diols or triols, with distillative removal of the excess diphenylmethane 4,4-diisocyanate, and these are compared with NCO prepolymers that are prepared without distillative removal of monomeric isocyanate, for which diphenylmethane 2,4-diisocyanate rather than the 4,4 isomer is of better suitability. The prepolymers described can be used for production of moisture-curing sealants and adhesives. There are no further details as to how such sealants or adhesives are formulated advantageously.

The use of blocked amines in moisture-curing polyurethane compositions based on conventional polymers containing isocyanate groups is known, for example from U.S. Pat. No. 7,625,993 or U.S. Pat. No. 8,252,859. Described therein are odorless blocked amines that enable blister-free curing.

SUMMARY OF THE INVENTION

It is an object of the present invention to improve the curing of polymers containing isocyanate groups and having a low monomeric diisocyanate content, especially those based on sterically hindered and/or aliphatic diisocyanates, such that they can be used for the production of high-quality moisture-curing polyurethane compositions.

Surprisingly, blocked amines, the use of which for the suppression of blister formation in moisture-curing polyurethane systems is known, enable significant improvement of curing in polymers containing isocyanate groups and having a low monomer level, especially those including sterically hindered and/or aliphatic isocyanate groups as derived from isophorone diisocyanate in particular. The use of blocked amines enables high-quality moisture-curing polyurethane compositions having an exceptionally low monomeric diisocyanate content, which cure rapidly and without significant residual surface tack, without any need for large amounts of catalysts that lower heat stability.

Furthermore, blocked amines in polymers containing isocyanate groups and having a low monomer level, especially those including sterically unhindered and/or aromatic isocyanate groups such as those derived from diphenylmethane 4,4-diisocyanate in particular, surprisingly enable a significant improvement in storage stability. This effect is particularly surprising given that the attainment of good storage stability is typically the challenge in the case of use of blocked amines in one-component, moisture-curing polyurethane compositions, and it is additionally difficult to attain good storage stability of compositions having a low monomeric diisocyanate content. It is not apparent from the prior art that the use of blocked amines in one-component compositions based on diphenylmethane 4,4-diisocyanate enables a significant improvement in storage stability.

In the context of this invention, it has been found that, surprisingly, the use of blocked amines can largely remedy weaknesses, especially in relation to storage stability, faultless curing and stability, that are triggered by the substantial absence of the monomeric diisocyanates in polyurethanes having a low monomer level that are free of labeling obligations.

The inventive use gives rise to moisture-curing polyurethane compositions that can be safely handled without special safety precautions and can be sold without hazard labeling owing to the monomeric diisocyanates in many countries. They have good storage stability and, on account of the low viscosity of the polymer containing isocyanate groups, excellent processability. They cure rapidly and reliably on contact with moisture. After curing, they have high elasticity and extensibility, high strength, low residual tack, good bonding properties and high stability to weathering influences. Such polyurethane compositions are usable particularly advantageously as elastic adhesives, sealants or coatings, especially also for particularly exposed outdoor applications in construction or in industry, for example on roofs, high-rise buildings or ships.

Further aspects of the invention are the subject of further independent claims. Particularly preferred embodiments of the invention are the subject of the dependent claims.

Ways of Executing the Invention

The present invention provides for the use of a blocked amine as curing aid for polymers containing isocyanate groups and having a low monomeric diisocyanate content, obtained from the reaction of at least one monomeric diisocyanate with at least one polyol in an NCO/OH ratio of at least 3/1, followed by removal of a majority of the monomeric diisocyanates by means of a suitable separation method, characterized in that the polymer containing isocyanate groups has a monomeric diisocyanate content of not more than 0.5% by weight.

"Monomeric diisocyanate" refers to an organic compound having two isocyanate groups separated by a divalent hydrocarbyl radical having 4 to 15 carbon atoms. "Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is determined by means of gel permeation chromatography (GPC) against polystyrene as standard, especially with tetrahydrofuran as mobile phase, refractive index detector and evaluation from 200 g/mol.

"NCO content" refers to the content of isocyanate groups in % by weight.

An "aromatic" isocyanate group refers to one bonded directly to an aromatic carbon atom. Isocyanates having exclusively aromatic isocyanate groups are correspondingly referred to as "aromatic isocyanates".

An "aliphatic" isocyanate group refers to one bonded directly to an aliphatic or cycloaliphatic carbon atom. Isocyanates having exclusively aliphatic isocyanate groups are correspondingly referred to as "aliphatic isocyanates".

A "polyetherurethane polymer" refers to a polymer having ether groups as repeat units and additionally containing urethane groups.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

A substance or composition is referred to as "storage-stable" or "storable" when it can be stored at room temperature in a suitable container over a prolonged period, typically over at least 3 months to up to 6 months or more, without any change in its application or use properties to a degree of relevance for the use thereof as a result of the storage.

"Room temperature" refers to a temperature of 23° C.

A dotted line in the formulae in each case represents the bond between a substituent and the corresponding molecular radical.

All industry standards and norms mentioned in this document relate to the versions valid at the date of first filing.

Percentages by weight (% by weight), abbreviated to wt %, refer to proportions by mass of a constituent of a composition or a molecule, based on the overall composition or the overall molecule, unless stated otherwise. The terms "mass" and "weight" are used synonymously in the present document.

The polymer containing isocyanate groups according to claim 1 may also be referred to as polyurethane prepolymer.

The polymer containing isocyanate groups and having a low monomeric diisocyanate content is preferably liquid at room temperature.

The polymer containing isocyanate groups preferably has a monomeric diisocyanate content of not more than 0.3% by weight, especially not more than 0.2% by weight. Such a polymer is particularly suitable for the production of formulations such as, in particular, elastic adhesives, sealants and coatings that have a monomeric diisocyanate content of less than 0.1% by weight; these can be safely handled even without special safety precautions and can thus be sold in many countries without hazard labeling.

The polymer containing isocyanate groups preferably has an average molecular weight $M_n$ in the range from 6000 to 20 000 g/mol.

The polymer containing isocyanate groups preferably has an NCO content in the range from 0.5% to 10% by weight, preferably 0.6% to 8.4% by weight, especially 0.8% to 7% by weight.

In a preferred embodiment of the invention, the polymer containing isocyanate groups has an average molecular weight $M_n$ in the range from 1000 to 4000 g/mol, especially 1200 to 3000 g/mol. The NCO content is preferably in the range from 2.1% to 8.4% by weight, especially 2.8% to 7% by weight. Such a polymer containing isocyanate groups is particularly suitable for use in elastic coatings for sealing of roofs or balconies, for example. It is preferably obtained from the reaction of at least one diol having an OH number in the range from 37 to 190 mg KOH/g, especially in the range from 56 to 150 mg KOH/g.

In a further preferred embodiment of the invention, the polymer containing isocyanate groups has an average molecular weight $M_n$ in the range from 3500 to 15 000 g/mol, more preferably 4000 to 12 000 g/mol, especially 5000 to 10 000 g/mol. The NCO content is preferably in the range from 0.6% to 3.5% by weight, more preferably 0.7% to 3% by weight, especially 0.8% to 2.5% by weight. Such a polymer containing isocyanate groups is particularly suitable for use in elastic sealants or adhesives. It is preferably obtained from the reaction of at least one polyol having an average OH functionality in the range from 1.9 to 3 and in OH number in the range from 8 to 56 mg KOH/g, 10 to 42 mg KOH/g.

Suitable monomeric diisocyanates are commercial aromatic or aliphatic diisocyanates, especially diphenylmethane 4,4-diisocyanate, optionally with fractions of diphenylmethane 2,4- and/or 2,2-diisocyanate (MDI), tolylene 2,4-diisocyanate or mixtures thereof with tolylene 2,6-diisocyanate (TDI), phenylene 1,4-diisocyanate (PDI), naphthalene 1,5-diisocyanate (NDI), hexane 1,6-diisocyanate (HDI), 2,2 (4),4-trimethylhexamethylene 1,6-diisocyanate (TMDI), cyclohexane 1,3- or 1,4-diisocyanate, 1-isocyanato-3,3,5-trimethyl-5-isocyanatomethylcyclohexane (isophorone diisocyanate or IPDI), perhydro-diphenylmethane 2,4- or 4,4-diisocyanate (HMDI), 1,3- or 1,4-bis(isocyanatomethyl)cyclohexane, m- or p-xylylene diisocyanate (XDI), m-tetramethylxylylene diisocyanate (TMXDI), or mixtures thereof.

The monomeric diisocyanate is preferably a sterically hindered diisocyanate, especially TDI, TMDI, IPDI or TMXDI. Such diisocyanates afford moisture-curing polyurethane compositions having particularly good storage stability, long open time and high extensibility, but which cure only poorly with a low monomeric diisocyanate content without additional use of blocked amines.

Most preferred among these is IPDI as monomeric diisocyanate. In this way, moisture-curing polyurethane compositions having good storage stability, long open time, high strength and particularly high stability to weathering influences are obtained. Moisture-curing polyurethane compositions based thereon and having a low monomeric diisocyanate content, however, cure only very slowly by means of moisture at ambient temperatures, and such high catalyst contents are needed even then that stability after curing is distinctly reduced. Surprisingly, such compositions, when blocked amines are used as curing aids, cure even without catalysts, such as organotin (IV) compounds in particular, reliably and rapidly to give elastic materials having low residual tack and excellent stability to weathering influences.

Further preferably, the monomeric diisocyanate is a sterically unhindered diisocyanate, especially MDI, PDI, HDI or HMDI. Such diisocyanates afford moisture-curing polyurethane compositions having a particularly high curing rate and strength, with surprisingly significant improvement in storage stability as a one-component composition through the additional use of blocked amines.

Most preferred among these is diphenylmethane 4,4'-diisocyanate as monomeric diisocyanate. In this way, moisture-curing polyurethane compositions having surprisingly good storage stability, particularly rapid curing and particularly high strength coupled with high elasticity are obtained.

Suitable polyols are commercial polyols that are preferably liquid at room temperature.

Preference is given to polyols having an average molecular weight $M_n$ in the range from 800 to 15 000 g/mol, more preferably 1000 to 12 000 g/mol, especially 2000 to 8500 g/mol.

The polyol preferably has an average OH functionality in the range from 1.7 to 3.

The polyol is preferably a diol or triol having an OH number in the range from 8 to 185 mg KOH/g, especially in the range from 10 to 120 mg KOH/g.

In one embodiment, preference is given to diols having an OH number in the range from 37 to 185 mg KOH/g, especially in the range from 44 to 120 mg KOH/g. Such a polymer containing isocyanate groups is particularly suitable for use in elastic coatings for sealing of roofs or balconies, for example.

In a further embodiment, preference is given to diols or triols having an OH number in the range from 8 to 56 mg KOH/g, especially in the range from 10 to 42 mg KOH/g. Such a polymer containing isocyanate groups is particularly suitable for use in elastic sealants or adhesives.

The polyol is preferably a polyether polyol, and the polymer containing isocyanate groups obtaining therefrom is thus a polyetherurethane polymer containing isocyanate groups. Such a polymer enables moisture-curing polyurethane compositions having high extensibility and elasticity. Repeat units present therein are preferably 1,2-ethyleneoxy, 1,2-propyleneoxy, 1,3-propyleneoxy, 1,2-butyleneoxy or 1,4-butyleneoxy groups.

More preferably, repeat units present in the polyether polyol are mainly or exclusively 1,2-propyleneoxy groups. More particularly, based on all repeat units, it has 80% to 100% by weight of 1,2-propyleneoxy groups and 0% to 20% by weight of 1,2-ethyleneoxy groups.

Polyoxyalkylene diols and/or polyoxyalkylene triols are particularly suitable, especially polymerization products of ethylene oxide or 1,2-propylene oxide or 1,2- or 2,3-butylene oxide or oxetane or tetrahydrofuran or mixtures thereof, where these may be polymerized with the aid of a starter molecule having two or more active hydrogen atoms, especially a starter molecule such as water, ammonia or a compound having multiple OH or NH groups, such as, for example, ethane-1,2-diol, propane-1,2- or -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- or -1,4-dimethanol, bisphenol A, hydrogenated bisphenol A, 1,1,1-trimethylolethane, 1,1,1-trimethylolpropane, glycerol or aniline, or mixtures of the abovementioned compounds.

Particular preference is given to polyoxypropylene diols, polyoxypropylene triols, or ethylene oxide-terminated polyoxypropylene diols or triols. These are polyoxyethylene/polyoxypropylene copolyols which are obtained especially by further alkoxylating polyoxypropylene diols or triols with ethylene oxide on conclusion of the polypropoxylation reaction, with the result that they ultimately have primary hydroxyl groups.

Preferred polyether polyols have a level of unsaturation of less than 0.02 meq/g, especially less than 0.01 meq/g.

In one embodiment, preference is given to a trimethylolpropane- or especially glycerol-started, optionally ethylene oxide-terminated, polyoxypropylene triol having an average molecular weight $M_n$ in the range from 3500 to 15 000 g/mol, preferably 4000 to 12 000 g/mol, especially 4500 to 8500 g/mol.

The NCO/OH ratio in the reaction between the monomeric diisocyanate and the polyol is preferably in the range from 3/1 to 10/1, more preferably in the range from 3/1 to 8/1, especially in the range from 4/1 to 7/1.

The reaction between the monomeric diisocyanate and the polyol is preferably conducted with exclusion of moisture at a temperature in the range from 20 to 160° C., especially 40 to 140° C., optionally in the presence of suitable catalysts.

After the reaction, the monomeric diisocyanate remaining in the reaction mixture is removed by means of a suitable separation method down to the residual content described.

A preferred separation method is a distillative method, especially thin-film distillation or short-path distillation, preferably with application of reduced pressure.

Particular preference is given to a multistage method in which the monomeric diisocyanate is removed in a short-path evaporator with a jacket temperature in the range from 120 to 200° C. and a pressure of 0.001 to 0.5 mbar.

In the case of IPDI, which is the preferred monomeric diisocyanate, the jacket temperature is preferably in the range from 140 to 180° C.

Preference is given to reacting the monomeric diisocyanate and the polyol and subsequently removing the monomeric diisocyanate remaining in the reaction mixture without use of solvents or entraining agents.

Preference is given to subsequently reusing the monomeric diisocyanate removed after the reaction, i.e. using it again for the preparation of polymer containing isocyanate groups.

In the reaction, the OH groups of the polyol react with the isocyanate groups of the monomeric diisocyanate. This also results in what are called chain extension reactions, in that there is reaction of OH groups and/or isocyanate groups of reaction products between polyol and monomeric diisocyanate. The higher the NCO/OH ratio chosen, the lower the level of chain extension reactions that takes place, and the lower the polydispersity and hence the viscosity of the polymer obtained. A measure of the chain extension reaction is the average molecular weight of the polymer, or the breadth and distribution of the peaks in the GPC analysis. A further measure is the effective NCO content of the polymer freed of monomers relative to the theoretical NCO content calculated from the reaction of every OH group with a monomeric diisocyanate.

The NCO content in the polymer containing isocyanate groups that has a low monomeric diisocyanate content which is cured using the blocked amine is preferably at least 80%, especially at least 85%, of the theoretical NCO content which is calculated from the addition of one mole of monomeric diisocyanate per mole of OH groups. Such a polymer has particularly low viscosity and enables moisture-curing polyurethane compositions having particularly good application properties.

The polymer containing isocyanate groups and having a low monomeric diisocyanate content preferably has a viscosity at 20° C. of not more than 50 Pas, especially not more than 40 Pas, more preferably not more than 30 Pas. The viscosity is determined here with a cone-plate viscometer having a cone diameter 25 mm, cone angle 1°, cone tip-plate distance 0.05 mm, at a shear rate of $10 \text{ s}^{-1}$.

Preferred polymers containing isocyanate groups enable high-quality, efficiently processable moisture-curing polyurethane compositions having high extensibility and elasticity.

A particularly preferred polymer containing isocyanate groups and having a low monomeric diisocyanate content has an NCO content in the range from 1% to 2.5% by weight, preferably 1.1% to 2.1% by weight, based on all repeat units in the polyether segment, 80% to 100% by weight, especially 80% to 90% by weight, of 1,2-propyleneoxy groups and 0% to 20% by weight, especially 10% to 20% by weight, of 1,2-ethyleneoxy groups and a monomeric diisocyanate content of not more than 0.3% by weight, and is obtained from the reaction of IPDI with a polyether triol having an average OH functionality in the range from 2.2 to 3, preferably 2.2 to 2.8, especially 2.2 to 2.6, and an OH number in the range from 10 to 42 mg KOH/g, especially 20 to 35 mg KOH/g. Such a polymer together with blocked amines enables moisture-curing polyurethane compositions that are particularly suitable as elastic adhesives or sealants, especially also for exposed outdoor applications.

A further particularly preferred polymer containing isocyanate groups and having a low monomeric diisocyanate content has an NCO content in the range from 2.8% to 7% by weight, based on all repeat units in the polyether segment, 100% propyleneoxy groups and a monomeric diisocyanate content of not more than 0.3% by weight, and is obtained from the reaction of IPDI with at least one polyether diol having an OH number in the range from 44 to 120 mg KOH/g. Such a polymer together with blocked amines enables moisture-curing polyurethane compositions that are particularly suitable as elastic coatings, especially also for exposed outdoor applications.

The blocked amine which is used as curing aid preferably has at least one aldimino group or oxazolidino group. These blocked amino groups are particularly storage-stable together with isocyanate groups with exclusion of moisture.

A suitable blocked amine is especially a bisoxazolidine, especially a bisoxazolidine of the formula (Ia) or (Ib)

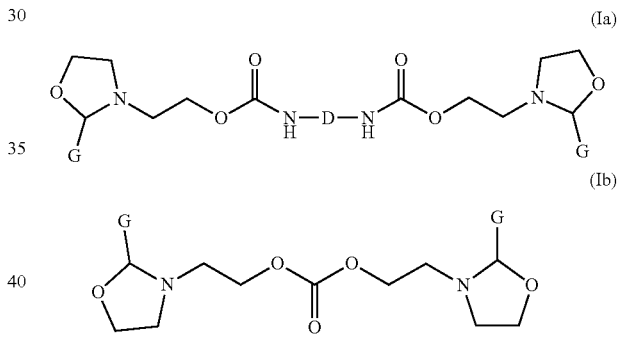

where

D is a divalent hydrocarbyl radical having 6 to 15 carbon atoms, especially 1,6-hexylene or (1,5,5-trimethylcyclohexan-1-yl) methane-1,3 or 4 (2)-methyl-1,3-phenylene, and G is a monovalent organic radical having 3 to 26 carbon atoms, especially 2-propyl, 3-heptyl, phenyl or a substituted phenyl radical.

More preferably, D is 1,6-hexylene and G is a substituted phenyl radical having 12 to 26 carbon atoms, especially a phenyl radical substituted in the para position by an optionally branched decylphenyl, undecylphenyl, dodecylphenyl, tridecylphenyl or tetradecylphenyl radical. Such a bisoxazolidine is liquid and odorless at room temperature, is storage-stable together with isocyanate groups and enables rapid curing.

The blocked amine preferably contains at least one aldimino group of the formula (IIa) or (IIb)

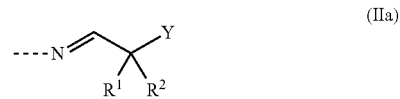

-continued

(IIb)

where
R$^1$ and R$^2$ are each independently a monovalent hydrocarbyl radical having 1 to 12 carbon atoms, or together are a divalent hydrocarbyl radical having 4 to 12 carbon atoms which is part of an optionally substituted carbocyclic ring having 5 to 8, preferably 6, carbon atoms,
Y is a monovalent organic radical having 1 to 25 carbon atoms, and
Z is an optionally substituted aryl or heteroaryl radical having 5 to 26 carbon atoms.

Such blocked amines are particularly storage-stable together with isocyanate groups with exclusion of moisture.

Preferably, R$^1$ and R$^2$ are each methyl.

Preferably, Y is a hydrocarbyl radical having 3 to 20 carbon atoms and optionally having ether, carbonyl, ester, amido, urethane, urea or tertiary amino groups. It preferably has an ester or tertiary amino group and optionally ether groups.

In a preferred embodiment, Y is a radical of the formula

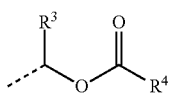

here R$^3$ is a hydrogen radical or a linear or branched alkyl, arylalkyl or alkoxycarbonyl radical having 1 to 12 carbon atoms, and R$^4$ is a hydrogen radical or a monovalent hydrocarbyl radical having 1 to 20 carbon atoms.

Preferably, R$^3$ is a hydrogen radical and R$^4$ is methyl or undecyl.

Such blocked amines are very storage-stable, even together with very reactive aromatic isocyanate groups of MDI.

A blocked amine with R$^4$=methyl has the advantage that the blocking agent released on curing diffuses out of the composition under ambient conditions, giving rise to mild odor nuisance and not causing any problems with migration or plasticizing action of the blocking agent.

A blocked amine with R$^4$=undecyl has the advantage that the blocking agent released on curing is entirely odorless and does not cause any emission load in respect of the environment.

In a further preferred embodiment, Y is a radical of the formula

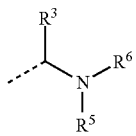

where R$^3$ has the definitions already given and R$^5$ and R$^6$ are each independently a linear or branched alkyl, cycloalkyl or aralkyl radical having 1 to 20 carbon atoms and optionally having ether groups, or together are a divalent hydrocarbyl radical having 4 to 12 carbon atoms which part of a 5- to 8-membered heterocyclic ring that may contain a ether, thioether or a further tertiary amino group in addition to the nitrogen atom.

Preferably, R$^5$ and R$^6$ together are 3-oxa-1,5-pentylene, and hence form a morpholine ring together with the nitrogen atom. Such a blocked amine is particularly storage-stable together with aliphatic isocyanate groups and, on curing, releases an odorless blocking agent which is of excellent compatibility in polyurethanes and exerts only a minor plasticizing effect.

Preferably, Z is a radical of the formula

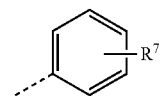

where R$^7$ is a hydrogen radical or a linear or branched alkyl or alkoxy radical having 1 to 20 carbon atoms.

Preferably, R$^7$ is an alkyl or alkoxy radical having 6 to 20 carbon atoms, especially an optionally branched decyl, undecyl, dodecyl, tridecyl or tetradecyl radical, more preferably an optionally branched alkyl radical having 10 to 14 carbon atoms in the para position. Such blocked amines are particularly easily obtainable industrially and, on curing, release an odorless blocking agent that shows a particularly low tendency to migration effects.

The blocked amine is more preferably a dialdimine or a trialdimine. A di- or trialdimine is typically of low viscosity and easily available industrially, and enables polyurethane products of high elasticity.

Most preferably, the blocked amine is selected from aldimines of the formula (IIIa), (IIIb) and (IIIc)

$$\left[ A \underset{}{\overset{}{\text{---}}} N \overset{R^3}{\underset{R^1 \;\; R^2}{=}} \overset{O}{\underset{O}{\overset{\|}{\text{---}}}} R^4 \right]_n \quad \text{(IIIa)}$$

$$\left[ A \underset{}{\overset{}{\text{---}}} N \overset{R^3}{\underset{R^1 \;\; R^2}{=}} \overset{R^6}{\underset{R^5}{N}} \right]_n \quad \text{(IIIb)}$$

$$\left[ A \underset{}{\overset{}{\text{---}}} N = \overset{}{\underset{}{\bigcirc}} R^7 \right]_n \quad \text{(IIIc)}$$

where
n is 2 or 3,
A is an n-valent aliphatic, cycloaliphatic or arylaliphatic hydrocarbyl radical optionally including ether oxygen and having a molecular weight in the range from 28 to 6000 g/mol,
and R$^1$, R$^2$, R$^3$, R$^4$, R$^5$, R$^6$ and R$^7$ have the definitions already given.

Such aldimines based on aliphatic di- or triamines are readily available and toxicologically particularly advantageous.

Preferably, R$^1$ and R$^2$ are each methyl, R$^3$ is a hydrogen radical, and either R$^4$ is a radical selected from methyl and undecyl, or R$^5$ and R$^6$ together are 3-oxa-1,5-pentylene, or R⁷ is an optionally branched alkyl radical having 10 to 14 carbon atoms in the para position.

Preferably, A has a molecular weight in the range from 28 to 500 g/mol. Such a blocked amine enables particularly high strengths.

Preferably, A is a radical selected from the group consisting of 1,6-hexylene, (1,5,5-trimethylcyclohexan-1-yl) methane-1,3,4 (2)-methyl-1,3-cyclohexylene, 1,3-cyclohexylenebis(methylene), 1,4-cyclohexylenebis(methylene), 1,3-phenylenebis(methylene), 1,2-cyclohexylene, 1,3-cyclohexylene, 1,4-cyclohexylene, methylenebis(2-methylcyclohexan-4-yl), (bicyclo[2.2.1] heptane-2,5 (2,6)-diyl)dimethylene, (tricyclo[5.2.1.0²·⁶] decane-3 (4),8 (9)-diyl)dimethylene, α, ω-polyoxypropylene having an average molecular weight $M_n$ in the range from 170 to 500 g/mol and trimethylolpropane- or glycerol-started tris(ω)-polyoxypropylene) having an average molecular weight in the range from 330 to 500 g/mol. Such blocked amines are derived from readily industrially available di- or triamines and enable polyurethane products having reliable curing and good mechanical properties.

Among these, preference is given to 1,6-hexylene, (1,5,5-trimethylcyclohexan-1-yl) methane-1,3, α,ω-polyoxypropylene having an average molecular weight $M_n$ in the range from 170 to 500 g/mol and trimethylolpropane- or glycerol-started tris(ω-polyoxypropylene) having an average molecular weight $M_n$ in the range from 330 to 500 g/mol.

More preferably, A is (1,5,5-trimethylcyclohexan-1-yl) methane-1,3. Such a blocked amine is derived from 1-amino-3,3,5-trimethyl-5-aminomethylcyclohexane (isophoronediamine or IPDA). Blocked amines derived therefrom are very particularly suitable as curing aids or polymers containing isocyanate groups and having a low IPDI-based monomeric diisocyanate content. The combination of IPDI-based polymer and IPDA-based blocked amine enables polyurethane products having very high elongation and particularly high strength.

The blocked amine is preferably selected from the group consisting of bisoxazolidines of the formula (Ia) in which D is 1,6-hexylene and G is a phenyl radical substituted in the para position by an optionally branched decylphenyl, undecylphenyl, dodecylphenyl, tridecylphenyl or tetradecylphenyl radical, N,N-bis(2,2-dimethyl-3-lauroyloxypropylidene) hexylene-1,6-diamine, N, N-bis(2,2-dimethyl-3-(N-morpholino) propylidene) hexylene-1,6-diamine, N,N-bis(2,2-dimethyl-3-acetoxypropylidene)-3-aminomethyl-3,5,5-trimethylcyclohexylamine, N,N-bis(2,2-dimethyl-3-lauroyloxypropylidene)-3-aminomethyl-3,5,5-trimethylcyclohexylamine, N,N-bis(4-$C_{10-14}$-alkylbenzylidene)-3-aminomethyl-3,5,5-trimethylcyclohexylamine, N,N-bis(2,2-dimethyl-3-(N-morpholino) propylidene)-3-aminomethyl-3,5,5-trimethylcyclohexylamine, N,N-bis(2,2-dimethyl-3-acetoxypropylidene) polyoxypropylenediamine having an average molecular weight $M_n$ in the range from 450 to 880 g/mol, N, N-bis(2,2-dimethyl-3-lauroyloxypropylidene) polyoxypropylenediamine having an average molecular weight $M_n$ in the range from 750 to 1050 g/mol, N, N-bis(4-$C_{10-14}$-alkylbenzylidene) polyoxypropylenediamine having an average molecular weight $M_n$ in the range from 680 to 1100 g/mol, N, N-bis(2,2-dimethyl-3-(N-morpholino) propylidene) polyoxypropylenediamine having an average molecular weight $M_n$ in the range from 500 to 800 g/mol, N, N, N-tris(2,2-dimethyl-3-acetoxypropylidene) polyoxypropylenetriamine having an average molecular weight $M_n$ in the range from 730 to 880 g/mol, N,N, N-tris(2,2-dimethyl-3-lauroyloxypropylidene) polyoxypropylenetriamine having an average molecular weight $M_n$ in the range from 1150 to 1300 g/mol, N, N, N-tris(4-$C_{10-14}$-alkylbenzylidene) polyoxypropylenetriamine having an average molecular weight $M_n$ in the range from 1000 to 1350 g/mol and N, N, N-tris(2,2-dimethyl-3-(N-morpholino) propylidene) polyoxypropylenetriamine having an average molecular weight $M_n$ in the range from 850 to 1000 g/mol.

Among these, preference is given to the aldimines. They are of particularly low viscosity.

Among these, preference is further given to the odorless types, especially for indoor applications.

Among these, preference is further given to the aldimines derived from 1-amino-3,3,5-trimethyl-5-aminomethylcyclohexane. In combination with IPDI-based polyurethane compositions, they enable particularly high strength coupled with high elasticity and particularly good weathering stability.

Likewise suitable are blocked amines having aldimino and oxazolidino groups, especially those having one aldimino group and one oxazolidino group.

The blocked amine is preferably obtained from the reaction of at least one amine with at least one aldehyde in a condensation reaction with release and optionally removal of water.

A preferred bisoxazolidine is especially obtained by first reacting diethanolamine with a stoichiometric or slightly superstoichiometric amount of at least one aldehyde and removing the water of condensation and any solvent present from the reaction mixture by a suitable method, optionally by heating thereof and/or application of reduced pressure. The hydroxyoxazolidine formed is subsequently converted to a bisoxazolidine by a suitable method, especially by reaction with a carbonate or a diisocyanate. Particular preference is given to reaction with HDI.

A preferred aldehyde for the preparation of oxazolidines is isobutyraldehyde, 2-ethylhexanal, benzaldehyde or 4-$C_{10-14}$-alkylbenzaldehyde. In this way, oxazolidines that are storage-stable together with isocyanates are obtained, which are hydrolyzed rapidly on contact with moisture in polyurethane compositions and enable reliable curing.

A preferred di- or trialdimine is especially obtained from the reaction of a stoichiometric or slightly superstoichiometric amount, in relation to the primary amino groups, of at least one polyamine of the formula (IV) with at least one aldehyde of the formula (Va) or (Vb), especially at least one aldehyde of the formula (VIa) or (VIb) or (VIc).

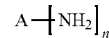

(IV)

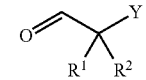

(Va)

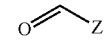

(Vb)

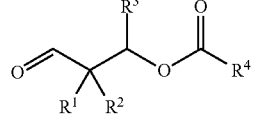

(VIa)

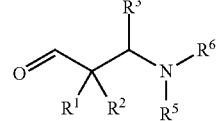

(VIb)

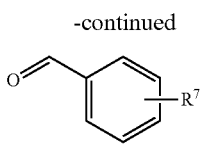
(VIc)

In the formulae (IV), (Va), (Vb), (VIa), (VIb) and (VIc), A, n, $R^1$, $R^2$, Y, Z, $R^3$, $R^4$, $R^5$, $R^6$ and $R^7$ have the definitions already given.

The reaction is advantageously conducted at a temperature in the range from 15 to 120° C., preferably at 20 to 100° C., optionally in the presence of a solvent. The water of condensation is preferably removed from the reaction mixture, either as an azeotrope with a suitable solvent or preferably directly by distillation, optionally under reduced pressure.

Optionally, a catalyst is used in the reaction, especially an acid catalyst.

Suitable amines of the formula (IV) are especially commercial primary aliphatic di- or triamines, especially ethane-1,2-diamine, propane-1,2-diamine, propane-1,3-diamine, butane-1,4-diamine, butane-1,3-diamine, 2-methylpropane-1,2-diamine, pentane-1,3-diamine, pentane-1,5-diamine, 2,2-dimethylpropane-1,3-diamine, hexane-1,6-diamine, 1,5-diamino-2-methylpentane, 1,3,6-triaminohexane, heptane-1,7-diamine, octane-1,8-diamine, 1,4,8-triaminooctane, 2,5-dimethylhexane-1,6-diamine, nonane-1,9-diamine, 2,2 (4),4-trimethylhexane-1,6-diamine, 4-aminomethyloctane-1,8-diamine, 5-aminomethyloctane-1,8-diamine, decane-1,10-diamine, undecane-1,11-diamine, 1,6,11-triaminoundecane, 2-butyl-2-ethylpentane-1,5-diamine, dodecane-1,12-diamine, cyclohexane-1,2-diamine, cyclohexane-1,3-diamine, cyclohexane-1,4-diamine, 1,3,5-triaminocyclohexane, 1-amino-3-aminomethyl-3,5,5-trimethylcyclohexane, 4 (2)-methylcyclohexane-1,3-diamine, 1,3-bis(aminomethyl)cyclohexane, 1,4-bis(aminomethyl)cyclohexane, 1,3,5-tris (aminomethyl)cyclohexane, bis(4-aminocyclohexyl) methane, bis(4-amino-3-methylcyclohexyl) methane, bis(4-amino-3-ethylcyclohexyl) methane, bis(4-amino-3,5-dimethylcyclohexyl) methane, bis(4-amino-3-ethyl-5-methylcyclohexyl) methane, 2,5 (2,6)-bis(aminomethyl) bicyclo [2.2.1]heptane, 3 (4),8 (9)-bis(aminomethyl)tricyclo [5.2.1.0$^{2,6}$]decane, 1,3-bis(aminomethyl)benzene, 1,4-bis (aminomethyl)benzene, 1,3,5-tris(aminomethyl)benzene, 3-oxapentane-1,5-diamine, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine, α,ω-polyoxypropylenediamine having an average molecular weight $M_n$ in the range from 200 to 4000 g/mol, especially the Jeffamine® products D-230, D-400, XTJ-582, D-2000, XTJ-578, D-4000 (all from Huntsman), α, ω-polyoxypropylenepolyoxyethylenediamine, especially the Jeffamine® products ED-600, ED-900, ED-2003, HK-511 (all from Huntsman), α,ω-polyoxypropylenepolyoxy-1,4-butylenediamine, especially the Jeffamine® products THF-100, THF-140, THF-230, XTJ-533 or XTJ-536 (all from Huntsman), α,ω-polyoxypropylenepolyoxy-1,2-butylenediamine, especially the Jeffamine® products XTJ-568 or XTJ-569 (both from Huntsman), α,ω-polyoxy-1,2-butylenediamine, especially Jeffamine® XTJ-523 (from Huntsman), trimethylolpropane- or glycerol-started tris(ω-polyoxypropyleneamine) having an average molecular weight $M_n$ in the range from 380 to 6000 g/mol, especially the Jeffamine® products T-403, T-3000 or T-5000 (all from Huntsman) or trimethyl-olpropane-started tris(ω-polyoxypropylenepolyoxy-1,2-butyleneamine), especially Jeffamine® XTJ-566 (from Huntsman).

Preferred amines of the formula (IV) are hexane-1,6-diamine, 1-amino-3-aminomethyl-3,5,5-trimethylcyclohexane, 4 (2)-methylcyclohexane-1,3-diamine, 1,3-bis(aminomethyl)cyclohexane, 1,4-bis(aminomethyl)cyclohexane, 1,3-bis(aminomethyl)benzene, cyclohexane-1,2-diamine, cyclohexane-1,3-diamine, cyclohexane-1,4-diamine, bis(4-aminocyclohexyl) methane, 2,5 (2,6)-bis (aminomethyl) bicyclo[2.2.1]heptane, 3 (4),8 (9)-bis(aminomethyl)tricyclo [5.2.1.0$^{2,6}$]decane, α,ω-polyoxypropylenediamine having an average molecular weight $M_n$ in the range from 200 to 500 g/mol or trimethylolpropane- or glycerol-started tris(ω-polyoxypropyleneamine) having an average molecular weight $M_n$ in the range from 380 to 500 g/mol.

Particular preference is given to hexane-1,6-diamine, 1-amino-3-aminomethyl-3,5,5-trimethylcyclohexane, α,ω-polyoxypropylenediamine having an average molecular weight $M_n$ in the range from 200 to 500 g/mol or trimethylolpropane- or glycerol-started tris(ω-polyoxypropyleneamine) having an average molecular weight $M_n$ in the range from 380 to 500 g/mol.

Most preferred is 1-amino-3-aminomethyl-3,5,5-trimethylcyclohexane.

Suitable aldehydes are especially tertiary aldehydes such as, in particular, 2,2-dimethylpropanal (pivalaldehyde), 2,2-dimethyl-3-phenylpropanal, 2,2-dimethyl-3-acetoxypropanal, 2,2-dimethyl-3-isobutyroxypropanal, 2,2-dimethyl-3-caproyloxypropanal, 2,2-dimethyl-3-benzoyloxypropanal, 2,2-dimethyl-3-capryloyloxypropanal, 2,2-dimethyl-3-caprinoyloxypropanal, 2,2-dimethyl-3-lauroyloxypropanal, 2,2-dimethyl-3-myristoyloxypropanal, 2,2-dimethyl-3-palmitoyloxypropanal, 2,2-dimethyl-3-stearoyloxypropanal, 2,2-dimethyl-3-dimethylaminopropanal, 2,2-dimethyl-3-diethylaminopropanal, 2,2-dimethyl-3-dibutylaminopropanal, 2,2-dimethyl-3-(N-pyrrolidino) propanal, 2,2-dimethyl-3-(N-piperidino) propanal, 2,2-dimethyl-3-(N-morpholino) propanal, 2,2-dimethyl-3-(N-(2,6-dimethyl) morpholino) propanal, 2,2-dimethyl-3-(N-(4-methylpiperazino)) propanal, 2,2-dimethyl-3-(N-(4-ethylpiperazino)) propanal, 2,2-dimethyl-3-(N-benzylmethylamino) propanal, 2,2-dimethyl-3-(N-benzylisopropylamino) propanal, 2,2-dimethyl-3-(N-methylcyclohexylamino) propanal, 2,2-dimethyl-3-bis(2-methoxyethyl)aminopropanal, or aromatic aldehydes such as, in particular, benzaldehyde or substituted benzaldehydes, especially benzaldehyde para-substituted by an optionally branched alkyl group having 10 to 14 carbon atoms.

Preference is given to 2,2-dimethyl-3-acetoxypropanal, 2,2-dimethyl-3-lauroxyloxypropanal, 2,2-dimethyl-3-(N-morpholino) propanal, benzaldehyde, 4-decylbenzaldehyde, 4-undecylbenzaldehyde, 4-dodecylbenzaldehyde, 4-tridecylbenzaldehyde, 4-tetradecylbenzaldehyde or mixtures of these benzaldehydes substituted by alkyl radicals.

Among these, the following are odorless: 2,2-dimethyl-3-lauroxyloxypropanal, 2,2-dimethyl-3-(N-morpholino) propanal, 4-decylbenzaldehyde, 4-undecylbenzaldehyde, 4-dodecylbenzaldehyde, 4-tridecylbenzaldehyde and 4-tetradecylbenzaldehyde.

A suitable blocked amine having an aldimino group and an oxazolidino group is especially obtained from the reaction of at least one amine of the formula

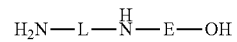

in which L is a divalent organic radical 2 to 30 carbon atoms and E is an optionally substituted 1,2-ethylene radical such as, in particular, N-(2-aminoethyl) ethanolamine or N-(3-(2-methylphenyloxy)-2-hydroxy-1-propyl) propane-1,2-diamine (from the reaction of o-cresyl glycidyl ether with propane-1,2-diamine) or N-(3-(2-methylphenyloxy)-2-hydroxy-1-propyl)-2 (4)-methylpentane-1,5-diamine (from the reaction of o-cresyl glycidyl ether with 1,5-diamino-2-methylpentane), with one of the aldehydes mentioned in a molar ratio of at least ½ with elimination and removal of water.

The blocked amine used may also be a mixture comprising two or more different blocked amines, especially blocked amines derived from different primary amines and/or blocked amines derived from different aldehydes.

The blocked amine is preferably used in such an amount that the number of blocked amino groups in relation to the number of isocyanate groups present is in the range from 0.1 to 1.1, especially 0.2 to 1.0, more preferably 0.3 to 0.9.

The inventive use affords a moisture-curing polyurethane composition especially having a monomeric diisocyanate content of less than 0.1% by weight.

The present invention thus further provides a moisture-curing polyurethane composition comprising at least one polymer containing isocyanate groups and having a low monomeric diisocyanate content, and at least one blocked amine as described above, characterized in that the moisture-curing polyurethane composition having a monomeric diisocyanate content of less than 0.1% by weight, based on the overall composition. Such a composition can be safely handled even without special safety precautions and can be sold in many countries without hazard labeling in relation to the monomeric diisocyanates present. It comprises at least one polymer containing isocyanate groups and having a low monomeric diisocyanate content, as described above, and at least one blocked amine, as described above.

The moisture-curing polyurethane composition preferably comprises at least one further constituent selected from oligomeric isocyanates, catalysts, fillers and plasticizers.

Suitable oligomeric isocyanates are especially HDI biurets such as Desmodur® N 100 or N 3200 (from Covestro), Tolonate® HDB or HDB-LV (from Vencorex) or Duranate® 24A-100 (from Asahi Kasei); HDI isocyanurates such as Desmodur® N 3300, N 3600 or N 3790 BA (all from Covestro), Tolonate® HDT, HDT-LV or HDT-LV2 (from Vencorex), Duranate® TPA-100 or THA-100 (from Asahi Kasei) or Coronate® HX (from Nippon Polyurethane); HDI uretdiones such as Desmodur® N 3400 (from Covestro); HDI iminooxadiazinediones such as Desmodur® XP 2410 (from Covestro); HDI allophanates such as Desmodur® VP LS 2102 (from Covestro); IPDI isocyanurates in solution, for example as Desmodur® Z 4470 (from Covestro), or in solid form, for example as Vestanat® T1890/100 (from Evonik); TDI oligomers such as Desmodur® IL (from Covestro); or mixed isocyanurates based on TDI/HDI, such as Desmodur® HL (from Covestro).

Suitable catalysts are especially catalysts for the hydrolysis of oxazolidino and/or aldimino groups, especially organic acids, especially carboxylic acids, such as 2-ethylhexanoic acid, lauric acid, stearic acid, isostearic acid, oleic acid, neodecanoic acid, benzoic acid, salicylic acid or 2-nitrobenzoic acid, organic carboxylic acid anhydrides, such as phthalic anhydride, hexahydrophthalic anhydride or methylhexahydrophthalic anhydride, silyl esters of carboxylic acids, organic sulfonic acids, such as methanesulfonic acid, p-toluenesulfonic acid or 4-dodecylbenzenesulfonic acid, sulfonic acid esters, other organic or inorganic acids, or mixtures of the abovementioned acids and acid esters. Particular preference is given to carboxylic acids, especially aromatic carboxylic acids, such as benzoic acid, 2-nitrobenzoic acid or especially salicylic acid.

Suitable catalysts are furthermore catalysts for the acceleration of the reaction of isocyanate groups, especially organotin (IV) compounds, such as especially dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complexes of bismuth (III) or zirconium (IV), especially with ligands selected from alkoxides, carboxylates, 1,3-diketonates, oxinate, 1,3-ketoesterates and 1,3-ketoamidates, or compounds containing tertiary amino groups, such as especially 2,2-dimorpholinodiethyl ether (DMDEE).

Also especially suitable are combinations of different catalysts.

Catalysts are present here for the acceleration of the reaction of isocyanate groups especially only in such an amount that the stability of the cured composition is not unduly impaired.

Suitable fillers are especially ground or precipitated calcium carbonates, optionally coated with fatty acids, especially stearates, barytes, quartz flours, quartz sands, dolomites, wollastonites, calcined kaolins, sheet silicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or hollow beads.

Preference is given to calcium carbonates that have optionally been coated with fatty acids, especially stearates, calcined kaolins or industrially produced carbon blacks.

Suitable plasticizers are especially carboxylic acid esters, such as phthalates, especially diisononyl phthalate (DINP), diisodecyl phthalate (DIDP) or di(2-propylheptyl) phthalate (DPHP), hydrogenated phthalates, especially hydrogenated diisononyl phthalate or diisononyl cyclohexane-1,2-dicarboxylate (DINCH), terephthalates, especially bis(2-ethylhexyl) terephthalate or diisononyl terephthalate, hydrogenated terephthalates, especially hydrogenated bis(2-ethylhexyl) terephthalate or diisononyl terephthalate, or bis(2-ethylhexyl)cyclohexane-1,4-dicarboxylate, trimellitates, adipates, especially dioctyl adipate, azelates, sebacates, benzoates, glycol ethers, glycol esters, organic phosphoric or sulfonic acid esters, polybutenes, polyisobutenes or plasticizers derived from natural fats or oils, especially epoxidized soybean or linseed oil.

The moisture-curing polyurethane composition may contain further additions, especially
  inorganic or organic pigments, especially titanium dioxide, chromium oxides or iron oxides;
  fibers, especially glass fibers, carbon fibers, metal fibers, ceramic fibers, polymer fibers, such as polyamide fibers or polyethylene fibers, or natural fibers, such as wool, cellulose, hemp or sisal;
  nanofillers such as graphene or carbon nanotubes;
  dyes;
  desiccants, especially molecular sieve powder, calcium oxide, highly reactive isocyanates such as p-tosyl isocyanate, monooxazolidines such as Incozol® 2 (from Incorez) or orthoformic esters;
  adhesion promoters, especially organoalkoxysilanes, especially epoxysilanes, such as especially 3-glycidoxypropyltrimethoxysilane or 3-glycidoxypropyltriethoxysilane, (meth)acrylosilanes, anhydridosilanes, carbamatosilanes, alkylsilanes or iminosilanes, or oligomeric forms of these silanes, or titanates;

further catalysts which accelerate the reaction of the isocyanate groups, especially salts, soaps or complexes of tin, zinc, bismuth, iron, aluminum, molybdenum, dioxomolybdenum, titanium, zirconium or potassium, especially tin (II) 2-ethylhexanoate, tin (II) neodecanoate, zinc (II) acetate, zinc (II) 2-ethylhexanoate, zinc (II) laurate, zinc (II) acetylacetonate, aluminum lactate, aluminum oleate, diisopropoxytitanium bis(ethyl acetoacetate) or potassium acetate; compounds containing tertiary amino groups, especially N-ethyldiisopropylamine, N, N,N, N-tetramethylalkylenediamines, pentamethylalkylenetriamines and higher homologs thereof, bis(N,N-diethylaminoethyl) adipate, tris(3-dimethylaminopropyl)amine, 1,4-diazabicyclo[2.2.2]octane (DABCO), 1,8-diazabicyclo[5.4.0]undec-7-ene (DBU), 1,5-diazabicyclo[4.3.0]non-5-ene (DBN), N-alkylmorpholines, N,N-dimethylpiperazine; aromatic nitrogen compounds, such as 4-dimethylaminopyridine, N-methylimidazole, N-vinylimidazole or 1,2-dimethylimidazole; organic ammonium compounds, such as benzyltrimethylammonium hydroxide or alkoxylated tertiary amines; what are called "delayed action" catalysts, which are modifications of known metal or amine catalysts;

rheology modifiers, especially thickeners, especially sheet silicates, such as bentonites, derivatives of castor oil, hydrogenated castor oil, polyamides, polyamide waxes, polyurethanes, urea compounds, fumed silicas, cellulose ethers or hydrophobically modified polyoxyethylenes;

solvents, especially acetone, methyl acetate, tert-butyl acetate, 1-methoxy-2-propyl acetate, ethyl 3-ethoxypropionate, diisopropyl ether, diethylene glycol diethyl ether, ethylene glycol diethyl ether, ethylene glycol monobutyl ether, ethylene glycol mono-2-ethylhexyl ether, acetals such as propylal, butylal, 2-ethylhexylal, dioxolane, glycerol formal or 2,5,7,10-tetraoxaundecane (TOU), toluene, xylene, heptane, octane, naphtha, white spirit, petroleum ether or gasoline, especially Solvesso™ grades (from Exxon), and propylene carbonate, dimethyl carbonate, butyrolactone, N-methylpyrrolidone, N-ethylpyrrolidone, p-chlorobenzotrifluoride or benzotrifluoride;

natural resins, fats or oils, such as rosin, shellac, linseed oil, castor oil or soybean oil;

nonreactive polymers, especially homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene/vinyl acetate copolymers (EVA) or atactic poly-α-olefins (APAO);

flame-retardant substances, especially the aluminum hydroxide or magnesium hydroxide fillers already mentioned, and also especially organic phosphoric acid esters, such as especially triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris (2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenylphosphate), bisphenol A bis(diphenylphosphate) or ammonium polyphosphates;

additives, especially wetting agents, leveling agents, defoamers, deaerators, stabilizers against oxidation, heat, light or UV radiation, or biocides;

or further substances customarily used in moisture-curing polyurethane compositions.

It may be advisable to chemically or physically dry certain substances before mixing them into the composition.

In the production of the polyurethane composition, the monomeric diisocyanate content is optionally further reduced by reaction with moisture present on mixing of the polyurethane polymer containing isocyanate groups with further constituents of the composition, especially fillers.

The moisture-curing polyurethane composition preferably contains 10% to 95% by weight, more preferably 15% to 80% by weight, especially 20% to 50% by weight, of the polymer containing isocyanate groups and having a low monomeric diisocyanate content.

In addition, the moisture-curing polyurethane composition may contain a certain proportion of further polymers containing isocyanate groups, especially also those prepared conventionally with a higher monomeric diisocyanate content.

The moisture-curing polyurethane composition is especially produced with exclusion of moisture and stored at ambient temperature in moisture-tight containers. A suitable moisture-tight container especially consists of an optionally coated metal and/or plastic, and is especially a drum, a transport box, a hobbock, a bucket, a canister, a can, a bag, a tubular bag, a cartridge or a tube.

The moisture-curing polyurethane composition may be in the form of a one-component composition or in the form of a multi-component, especially two-component, composition.

A composition referred to as a "one-component" composition is one in which all constituents of the composition are in the same container and which is storage-stable per se.

A composition referred to as a "two-component" composition is one in which the constituents of the composition are in two different components which are stored in separate containers and are not mixed with one another until shortly before or during the application of the composition.

The moisture-curing polyurethane composition is preferably a one-component composition. Given suitable packaging and storage, it is storage-stable, typically over several months, up to one year or longer.

On application of the moisture-curing polyurethane composition, the process of curing commences. This results in the cured composition.

In the case of a one-component composition, it is applied as such and then begins to cure under the influence of moisture or water. For acceleration of the curing, an accelerator component which contains or releases water and/or a catalyst and/or a curing agent can be mixed into the composition on application, or the composition, after application thereof, can be contacted with such an accelerator component.

In the course of curing, the isocyanate groups react with the blocked amino groups under the influence of moisture. Some of the isocyanate groups, especially the excess isocyanate groups relative to the blocked amino groups, react with one another under the influence of moisture and/or with any further reactive groups present in the composition, especially hydroxyl groups or free amino groups. The totality of these reactions of isocyanate groups that lead to the curing of the composition is also referred to as crosslinking.

The moisture required for curing of the moisture-curing polyurethane composition preferably gets into the composition through diffusion from the air (atmospheric moisture). In the process, a solid layer of cured composition ("skin") is formed on the surfaces of the composition which come into contact with air. The curing continues in the direction of diffusion from the outside inward, the skin becoming increasingly thick and ultimately encompassing the entire composition applied. The moisture can also get into the composition additionally or entirely from one or more substrate(s) to which the composition has been applied and/or can come from an accelerator component which is mixed into the composition on application or is contacted therewith after application, for example by painting or spraying.

The moisture-curing polyurethane composition is preferably applied at ambient temperature, especially in the range from about −10 to 50° C., preferably in the range from −5 to 45° C., more preferably in the range from 0 to 40° C. The moisture-curing polyurethane composition is preferably likewise cured at ambient temperature.

The moisture-curing polyurethane composition has a long processing time (open time) and rapid curing.

"Open time" refers to the period of time during which the composition can be processed or reprocessed after application without any loss of its ability to function. In the case of a one-component composition, the open time has been exceeded when a skin has formed, if not sooner.

The "curing rate" refers to the degree of polymer formation in the composition within a given period of time after application, for example by determining the thickness of the skin formed.

Crosslinking releases the aldehyde used for the blocking of the amino groups. If the aldehyde is largely nonvolatile and odorless, it will remain for the most part in the cured composition and act as plasticizer.

Preference is given to using the moisture-curing polyurethane composition as elastic adhesive or elastic sealant or elastic coating.

The moisture-curing polyurethane composition as adhesive and/or sealant is especially suitable for bonding and sealing applications in the construction and manufacturing industry or in motor vehicle construction, especially for parquet bonding, assembly, bonding of installable components, module bonding, pane bonding, join sealing, bodywork sealing, seam sealing or cavity sealing.

Elastic bonds in motor vehicle construction are, for example, the bonded attachment of parts such as plastic covers, trim strips, flanges, fenders, drivers cabins or other installable components to the painted body of a motor vehicle, or the bonding of panes into the vehicle body, said motor vehicles especially being automobiles, trucks, buses, rail vehicles or ships.

The moisture-curing polyurethane composition is especially suitable as sealant for the elastic sealing of all kinds of joins, seams or cavities, especially of joins in construction, such as expansion joins or connection joins between structural components, or of floor joins in civil engineering. A sealant having flexible properties and high cold flexibility is particularly suitable especially for the sealing of expansion joins in built structures.

As a coating, the moisture-curing polyurethane composition is especially suitable for protection and/or for sealing of built structures or parts thereof, especially for balconies, terraces, roofs, especially flat roofs or slightly inclined roof areas or roof gardens, or in building interiors beneath tiles or ceramic plates in wet rooms or kitchens, or in collection pans, conduits, shafts, silos, tanks or wastewater treatment systems.

It can also be used for repair purposes as seal or coating, for example of leaking roof membranes or floor coverings that are no longer fit for purpose, or as repair compound for highly reactive spray seals.

The moisture-curing polyurethane composition can be formulated such that it has a pasty consistency with structurally viscous properties. A composition of this kind is applied by means of a suitable device, for example from commercial cartridges or kegs or hobbocks, for example in the form of a bead, which may have an essentially round or triangular cross-sectional area.

The moisture-curing polyurethane composition can also be formulated such that it is fluid and "self-leveling" or only slightly thixotropic and can be poured out for application. As coating, it can, for example, subsequently be distributed flat up to the desired layer thickness, for example by means of a roller, a slide bar, a toothed applicator or a trowel. In one operation, typically a layer thickness in the range from 0.5 to 3 mm, especially 1.0 to 2.5 mm, is applied.

Suitable substrates which can be bonded or sealed or coated with the moisture-curing polyurethane composition are especially glass, glass ceramic, concrete, mortar, cement screed, fiber cement, especially fiber cement boards, brick, tile, gypsum, especially gypsum boards or anhydride screed, or natural stone, such as granite or marble;

repair or leveling compounds based on PCC (polymer-modified cement mortar) or ECC (epoxy resin-modified cement mortar);

metals or alloys, such as aluminum, copper, iron, steel, nonferrous metals, including surface-finished metals or alloys, such as zinc-plated or chromium-plated metals;

asphalt or bitumen;

leather, textiles, paper, wood, wood materials bonded with resins, such as phenolic, melamine or epoxy resins, resin/textile composites or further materials called polymer composites;

plastics, such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;

fiber-reinforced plastics, such as carbon fiber-reinforced plastics (CFP), glass fiber-reinforced plastics (GFP) and sheet molding compounds (SMC);

insulation foams, especially made of EPS, XPS, PUR, PIR, rock wool, glass wool or foamed glass;

coated or painted substrates, especially painted tiles, coated concrete, powder-coated metals or alloys or painted metal sheets;

paints or varnishes, especially automotive topcoats.

If required, the substrates can be pretreated prior to application, especially by physical and/or chemical cleaning methods or the application of an activator or a primer.

It is possible to bond and/or seal two identical or two different substrates.

The invention further provides a method of bonding or sealing, comprising the steps of
(i) applying the moisture-curing polyurethane composition from the inventive use
to a first substrate and contacting the composition with a second substrate within the open time of the composition, or to a first and to a second substrate and joining the two substrates within the open time of the composition, or between two substrates, (ii) curing the composition by contact with moisture.

The invention further provides a method of coating or sealing, comprising the steps of (i) applying the moisture-curing polyurethane composition from the inventive use to a substrate, (ii) curing the composition by contact with moisture.

The application and curing of the moisture-curing polyurethane composition or the method of bonding or sealing or the method of coating or sealing affords an article bonded or sealed or coated with the composition. This article may be a built structure or a part thereof, especially a built structure in civil engineering above or below ground, a bridge, a roof, a staircase or a façade, or it may be an industrial good or a consumer good, especially a window, a pipe, a rotor blade of a wind turbine, a domestic appliance or a mode of transport, such as especially an automobile, a bus, a truck, a rail vehicle, a ship, an aircraft or a helicopter, or an installable component thereof.

The invention thus further provides an article obtained from the described method of bonding or sealing or from the described method of coating or sealing.

The moisture-curing polyurethane composition obtained from the inventive use has advantageous properties. It can be safely handled even without special safety precautions and can be sold in many countries without hazard labeling in relation to the monomeric diisocyanate content, has good storage stability and has excellent processability. On contact with moisture, it cures rapidly and reliably to give a material of high elasticity and extensibility, high strength, low residual tack, good bonding properties and high stability to weathering influences. It is thus especially also suitable for exposed outdoor applications in construction or in industry, for example on roofs, high-rise buildings or ships.

EXAMPLES

Working examples are presented hereinbelow, which are intended to further elucidate the invention described. The invention is of course not limited to these described working examples.

"Standard climatic conditions" ("SCC") refer to a temperature of 23±1° C. and a relative air humidity of 50±5%.

Unless stated otherwise, the chemicals used were from Sigma-Aldrich.

Preparation of polymers containing isocyanate groups:

The viscosity was measured with a thermostated Rheotec RC30 cone-plate viscometer (cone diameter 25 mm, cone angle 1°, cone tip-plate distance 0.05 mm, shear rate 10 s$^{-1}$).

Monomeric diisocyanate content was determined by means of HPLC (detection via photodiode array; 0.04 M sodium acetate/acetonitrile as mobile phase) after prior derivation by means of N-propyl-4-nitrobenzylamine.

Polymer P-1:

780.0 g of Desmophen® 5031 BT (glycerol-started ethylene oxide-terminated polyoxypropylene triol, OH number 28.0 mg KOH/g, OH functionality about 2.3; from Covestro) and 220 g of 1-isocyanato-3,3,5-trimethyl-5-isocyanatomethylcyclohexane (Vestanat® IPDI, from Evonik) were converted in the presence of 0.01 g of dibutyltin dilaurate by a known method at 80° C. to a polyetherurethane polymer having an NCO content of 6.4% by weight, a viscosity of 4.1 Pas at 20° C. and a monomeric IPDI content of about 12% by weight.

Subsequently, the volatile constituents, especially the majority of the monomeric IPDI, were removed by distillation in a short-path evaporator (jacket temperature 160° C., pressure 0.1 to 0.005 mbar). The polyetherurethane polymer thus obtained had an NCO content of 1.9% by weight, a viscosity of 8.2 Pas at 20° C. and a monomeric IPDI content of 0.02% by weight.

Polymer P-2:

725 g of Desmophen® 5031 BT (glycerol-started ethylene oxide-terminated polyoxypropylene triol, OH number 28.0 mg KOH/g, OH functionality about 2.3; from Covestro) and 275 g of diphenylmethane 4,4-diisocyanate (Desmodur® 44 MC L, from Covestro) were converted by a known method at 80° C. to a polyetherurethane polymer having an NCO content of 7.6% by weight, a viscosity of 6.5 Pa's at 20° C. and a monomeric diphenylmethane 4,4-diisocyanate content of about 20% by weight.

Subsequently, the volatile constituents, especially the majority of the monomeric diphenylmethane 4,4-diisocyanate, were removed by distillation in a short-path evaporator (jacket temperature 180° C., pressure 0.1 to 0.005 mbar, condensation temperature 47° C.). The polyetherurethane polymer thus obtained had an NCO content of 1.7% by weight, a viscosity of 19 Pas at 20° C. and a monomeric diphenylmethane 4,4-diisocyanate content of 0.04% by weight.

Polymer R-1:894.

894.5 g of Desmophen® 5031 BT (glycerol-started ethylene oxide-terminated polyoxypropylene triol, OH number 28.0 mg KOH/g, OH functionality about 2.3; from Covestro) and 105.0 g of 1-isocyanato-3,3,5-trimethyl-5-isocyanatomethylcyclohexane (Vestanat® IPDI, from Evonik) were converted in the presence of 0.01 g of dibutyltin dilaurate by a known method at 80° C. to a polyetherurethane polymer having an NCO content of 1.9% by weight and a monomeric IPDI content of about 1.4% by weight.

Polymer R-2:

685 g of Voranol® CP 4755 (glycerol-started ethylene oxide-terminated polyoxypropylene triol, OH number 35.0 mg KOH/g, OH functionality about 2.4; from Dow), 115 g of diphenylmethane 4,4-diisocyanate (Desmodur® 44 MC L, from Covestro) and 200 g of diisodecyl phthalate were converted by a known method at 80° C. to a polyetherurethane polymer having an NCO content of 1.9% by weight and a monomeric diphenylmethane 4,4-diisocyanate content of about 2.1% by weight.

Polymers P-1 and P-2 are inventive polymers containing isocyanate groups and having a low monomeric diisocyanate content. Polymers R-1 and R-2 are conventionally prepared polymers containing isocyanate groups and having a much higher monomeric diisocyanate content, and serve for comparison.

Preparation of Blocked Amines:

Amine value (including aldimino and oxazolidino groups) was determined by means of titration (with 0.1N HClO$_4$ in acetic acid versus crystal violet).

Aldimine A1: N, N-Bis(2,2-dimethyl-3-lauroyloxypropylidene)-3-aminomethyl-3,5,5-trimethylcyclohexylamine 100.0 g (0.35 mol) of 2,2-dimethyl-3-lauroyloxypropanal was initially charged in a round-bottom flask under a nitrogen atmosphere. Then 27.9 g (0.16 mol) of 3-aminomethyl-3,5,5-trimethylcyclohexylamine (Vestamin® IPD, from Evonik) was added with good stirring and then the volatile constituents were removed at 80° C. and a reduced pressure of 10 mbar. What was obtained was a colorless liquid having an amine value of 153 mg KOH/g, corresponding to a calculated aldimine equivalent weight of 367 g/mol.

Aldimine A2:

100.00 g of a fractionated reaction mixture containing mainly branched 4-($C_{10-14}$-alkyl)benzaldehydes (obtained from formylation, catalyzed by means of $HF—BF_3$, of $C_{10-14}$-alkylbenzene, average aldehyde equivalent weight 290 g/eq) was initially charged in a round-bottom flask under a nitrogen atmosphere. 27.86 g of 3-aminomethyl-3,5,5-trimethylcyclohexylamine (Vestamin® IPD, from Evonik) was added while stirring, and then the volatile constituents were removed at 80° C. and a reduced pressure of 10 mbar. What was obtained was a pale yellow, odorless liquid having an amine value of 150 mg KOH/g, corresponding to a calculated aldimine equivalent weight of 374 g/mol.

Aldimine A3: N,N-Bis(2,2-dimethyl-3-(N-morpholino) propylidene)-3-aminomethyl-3,5,5-trimethylcyclohexylamine 100.0 g (0.58 mol) of 2,2-dimethyl-3-(N-morpholino) propanal was initially charged in a round-bottom flask under a nitrogen atmosphere. Then 47.4 g (0.28 mol) of 3-aminomethyl-3,5,5-trimethylcyclohexylamine (Vestamin® IPD, from Evonik) was added with good stirring and then the volatile constituents were removed at 80° C. and a reduced pressure of 10 mbar. What was obtained was a colorless liquid having an amine value of 227 mg KOH/g, corresponding to a calculated aldimine equivalent weight of 247 g/mol.

Aldimine A4: N, N-Bis(2,2-dimethyl-3-acetoxypropylidene)-3-aminomethyl-3,5,5-trimethylcyclohexylamine 100.0 g (0.69 mol) of 2,2-dimethyl-3-acetoxypropanal was initially charged in a round-bottom flask under a nitrogen atmosphere. Then 56.2 g (0.33 mol) of 3-aminomethyl-3,5,5-trimethylcyclohexylamine (Vestamin® IPD, from Evonik) was added with good stirring, and then the volatile constituents were removed at 80° C. and a reduced pressure of 10 mbar. What was obtained was a colorless liquid having an amine value of 263 mg KOH/g, corresponding to a calculated aldimine equivalent weight of 213 g/mol.

Aldimine A5: N, N-Bis(2,2-dimethyl-3-lauroyloxypropylidene) hexylene-1,6-diamine 100.0 g (0.35 mol) of 2,2-dimethyl-3-lauroyloxypropanal was initially charged in a round-bottom flask under a nitrogen atmosphere. Then 26.5 g (0.16 mol) of hexane-1,6-diamine solution (70% by weight in water) was added with good stirring, and then the volatile constituents were removed at 80° C. and a reduced pressure of 10 mbar. What was obtained was a colorless liquid having an amine value of 160 mg KOH/g, corresponding to a calculated aldimine equivalent weight of 351 g/mol.

Oxazolidine A6: Bisoxazolidine

To an initial charge of 63.09 g (0.6 mol) of diethanolamine in a round-bottom flask was added 178.09 g of a fractionated reaction mixture containing mainly branched 4-($C_{10-14}$-alkyl)benzaldehydes (obtained from formylation, catalyzed by means of $HF—BF_3$, of $C_{10-14}$-alkylbenzene, average aldehyde equivalent weight 290 g/eq) and 0.50 g of salicylic acid, and the reaction mixture was stirred at 80° C. under reduced pressure until all the water had been removed. A yellowish liquid having an amine value of 141.6 mg KOH/g was obtained. (=hydroxyl-functional monooxazolidine, intermediate)

37.80 g of the hydroxyl-functional monooxazolidine thus obtained was initially charged in a round-bottom flask under a nitrogen atmosphere and heated up. At 80° C., 8.33 g of hexane 1,6-diisocyanate was added dropwise and then the mixture was stirred at 80° C. until no isocyanate groups were detectable any longer by means of IR spectroscopy. A highly viscous yellow oil that was liquid at room temperature and had an amine value of 116.4 mg KOH/g was obtained, which corresponds to a calculated equivalent weight for the oxazolidino groups of 482 g/mol.

Moisture-curing polyurethane compositions:

Compositions C-1 to C-10:

For each composition, the ingredients specified in table 1 were well mixed in the amounts specified (in parts by weight) by means of a planetary mixer under reduced pressure and with exclusion of moisture, and stored with exclusion of moisture.

The thickener paste was produced by gently heating an initial charge of 300 g of diisodecyl phthalate and 48 g of diphenylmethane 4,4-diisocyanate (Desmodur® 44 MC L, from Covestro) in a vacuum mixer and then slowly adding 27 g of monobutylamine dropwise while stirring vigorously. The resultant paste was stirred for a further hour under reduced pressure while cooling.

Each composition was tested as follows:

Odor was assessed by smelling by nose at a distance of 2 cm from the freshly produced films. "Yes" means that an odor was clearly perceptible. "No" means that no odor was perceptible.

A measure determined for the processing time (open time) was the skin time (ST). For this purpose, a few grams of the composition were applied to cardboard in a layer thickness of about 2 mm and, under standard climatic conditions, the time until, when the surface of the composition was gently tapped by means of an LDPE pipette, there were for the first time no residues remaining any longer on the pipette was determined. "No cure" means that no skin had formed within 3 days.

Shore A hardness was determined to DIN 53505 on test specimens cured under standard climatic conditions for 3 d, 7 d, 11 d, 14 d, 21 d and 28 d.

Surface tack was assessed on the Shore A test specimens that had been cured under standard climatic conditions for 7 days.

For determination of mechanical properties, each composition was pressed between two wax-coated transfer printing papers to give a film of thickness 2 mm and stored under standard climatic conditions for 7 days. After the wax papers had been removed, some dumbbells having a length of 75 mm with a bar length of 30 mm and a bar width of 4 mm were punched out of the film, and these were tested to DIN EN 53504 at a strain rate of 200 mm/min for tensile strength ("TS"), elongation at break ("EaB") and modulus of elasticity ("MoE"; at 0.5-5% elongation).

To determine the strength of an adhesive bond, lap shear strength (LSS) was determined on glass. For this purpose, test specimens were produced by bonding two glass plates that had been degreased with isopropanol and pretreated with Sika® Aktivator 100 (from Sika Schweiz) in such a way that the overlapping adhesive bond had dimensions of 12×25 mm and a thickness of 4 mm and the glass plates protruded at the top ends. After the composite bodies had been stored under standard climatic conditions for 7 d, lap shear strength was tested to DIN EN 1465 at a strain rate of 20 mm/min.

The results are reported in table 1.
The examples labeled (Ref.) are comparative examples.

slower curing again and a tacky surface. In contrast, the comparison of inventive composition C-6 (low monomeric

TABLE 1

Composition and properties of C-1 to C-10.

| Composition | C-1 (Ref.) | C-2 (Ref.) | C-3 (Ref.) | C-4 | C-5 | C-6 | C-7 (Ref.) |
|---|---|---|---|---|---|---|---|
| Polymer P-1 | 30.0 | 30.0 | — | 30.0 | 30.0 | 30.0 | — |
| Polymer R-1 | — | — | 30.0 | — | — | — | 30.0 |
| Thickener paste | 25.0 | 25.0 | 25.0 | 25.0 | 25.0 | 25.0 | 25.0 |
| Chalk[1] | 38.0 | 38.0 | 38.0 | 38.0 | 38.0 | 38.0 | 38.0 |
| DIDP[2] | 6.6 | 5.0 | 5.0 | 2.2 | 2.6 | 4.0 | 3.85 |
| Aldimine | — | — | — | A1 4.3 | A2 3.9 | A3 2.5 | A3 2.65 |
| Oxazolidine A6 | — | — | — | — | — | — | — |
| SA solution[3] | — | — | 0.5 | 0.5 | 0.5 | 0.5 | 0.5 |
| DBTDL soln.[4] | — | 2.0 | 2.0 | — | — | — | — |
| Odor | no | no | no | no | no | no | no |
| ST | no cure | 40 h | 10 h | 2.5 h | 8 h | 1.5 h | 1 h |
| Shore A | n.d. | 14 | 20 | 10 | <10 | 15 | 31 |
| 3 d SCC | | 31 | 36 | 18 | 18 | 21 | 36 |
| | | 33 | 36 | 23 | 23 | 25 | 41 |
| | | 33 | 36 | 25 | 25 | 27 | 42 |
| | | 33 | 36 | 28 | 27 | 31 | 43 |
| | | 33 | 36 | 31 | 28 | 31 | 44 |
| Surface | n.d. | slightly tacky | nontacky | nontacky | nontacky | nontacky | nontacky |
| TS [MPa] | n.d. | 1.2 | 1.4 | 2.1 | 2.7 | 2.3 | 2.9 |
| EaB [%] | | 555 | 623 | 1025 | 969 | 921 | 842 |
| MoE [MPa] | | 1.4 | 1.7 | 1.1 | 1.2 | 1.1 | 2.3 |
| LSS [MPa] | n.d. | 0.7 | 0.9 | 0.7 | 1.1 | 0.9 | 1.5 |

| Composition | C-8 | C-9 | C-10 |
|---|---|---|---|
| Polymer P-1 | 30.0 | 30.0 | 30.0 |
| Polymer R-1 | — | — | — |
| Thickener paste | 25.0 | 25.0 | 25.0 |
| Chalk[1] | 38.0 | 38.0 | 38.0 |
| DIDP[2] | 4.3 | 2.4 | 1.5 |
| Aldimine | A4 2.2 | A5 4.1 | — |
| Oxazolidine A6 | — | — | 5.0 |
| SA solution[3] | 0.5 | 0.5 | 0.5 |
| DBTDL soln.[4] | — | — | — |
| Odor | yes | no | no |
| ST | 2.5 h | 1.5 h | 1 h |
| Shore A  3 d SCC | 12 | 10 | 20 |
| 7 d SCC | 24 | 15 | 21 |
| 11 d SCC | 24 | 19 | 26 |
| 14 d SCC | 27 | 21 | 29 |
| 21 d SCC | 30 | 25 | 32 |
| 28 d SCC | 32 | 27 | 35 |
| Surface | nontacky | nontacky | nontacky |
| Tensile strength [MPa] | 2.2 | 1.5 | 1.6 |
| Elongation at break [%] | 961 | 998 | 656 |
| MoE [MPa] | 1.1 | 0.7 | 0.6 |
| LSS [MPa] | 1.4 | 0.8 | 0.9 |

"n.d." stands for "not determined" (no curing)
[1] Omyacarb ® 5 GU (from Omya)
[2] diisodecyl phthalate
[3] 5% by weight of salicylic acid in dioctyl adipate
[4] 4% by weight of dibutyltin dilaurate in diisodecyl phthalate Table 1 shows the properties of isophorone diisocyanate-based compositions, which have very high light stability. In the case of these systems, because isophorone diisocyanate is sterically hindered, aliphatic and hence comparatively slow to react, the challenge is to achieve reliable curing to give a material having a tack-free surface and good mechanical properties. The comparison of reference compositions C-2 (low monomeric diisocyanate content, no blocked amine) and C-3 (high monomeric diisocyanate content, no blocked amine) shows that C-2, because of the lack of monomeric diisocyanates, exhibits significantly diisocyanate content, aldimine A-3) with reference composition C-7 (high monomeric diisocyanate content, aldimine A-3) shows that the inventive composition C-6 cures almost equally rapidly to give a nontacky material. Thus, the inventive use enables very light-stable compositions having no labeling obligation that, owing to high light stability and the tack-free surface, are particularly suitable for use in particularly exposed outdoor applications, for example on ships.

For determination of heat stability, some of the dumbbells punched out as described above were stored in an air circulation oven at 80° C. or 90° C. or 100° C. for 7 days, then cooled down to room temperature and tested as described above for tensile strength, elongation at break and modulus of elasticity. The results are given the addition "7d 80° C." or "7d 90° C." or "7d 100° C.".

These results are reported in table 2.

The example labeled with (Ref.) is a comparative example.

TABLE 2

Heat stability of C-2 (Ref.), C-5, C-8 and C-10.

| Composition | C-2 (Ref.) | C-5 | C-8 | C-10 |
|---|---|---|---|---|
| 7 d 80° C.: | | | | |
| Tensile strength [MPa] | 1.6 | 2.8 | 3.3 | 1.5 |
| Elongation at break [%] | 786 | 805 | 833 | 256 |
| MoE [MPa] | 1.7 | 2.6 | 2.8 | 4.5 |
| 7 d 90° C.: | | | | |
| Tensile strength [MPa] | liquid | 3.1 | 3.2 | 1.4 |
| Elongation at break [%] | | 900 | 845 | 307 |
| MoE [MPa] | | 1.5 | 1.7 | 3.6 |
| 7 d 100° C.: | | | | |
| Tensile strength [MPa] | liquid | 1.0 | not determined | 1.2 |
| Elongation at break [%] | | 990 | | 367 |
| MoE [MPa] | | 1.0 | | 2.7 |

Table 2 shows the limited heat stability of reference composition C-2, probably because of the high tin catalyst content.

Compositions C-11 to C-14:

For each composition, the ingredients specified in table 3 were well mixed in the amounts specified (in parts by weight) by means of a planetary mixer under reduced pressure and with exclusion of moisture, and stored with exclusion of moisture.

The thickener paste was produced as described for C-1.
Each Composition was Tested as Follows:

As a measure of storage stability, the expression force of the composition after storage was determined by storing one closed cartridge in each case at room temperature for 7 days or at 60° C. in an air circulation oven for 7 days, and then measuring the expression force by means of an expression device (Zwick/Roell Z005). For this purpose, the cartridge, after being conditioned under standard climatic conditions for 12 hours, was opened, a nozzle of internal diameter 3 mm was screwed on to the cartridge and then the force required to express the composition through the nozzle at an expression rate of 60 mm/min was measured. The value reported is the average of the forces that were measured after an expression distance of 22 mm, 24 mm, 26 mm and 28 mm. The results are given the addition "7d RT" or "7d 60° C." according to the manner of storage of the closed cartridge.

As a measure of processing time (open time), skin time was determined as described for composition C-1.

Shore A hardness was determined according to DIN 53505 on test specimens cured under standard climatic conditions for 1 d, 2 d and 7 d.

For determination of tensile strength, elongation at break, modulus of elasticity 0.5-50% elongation ("MoE 50%") and tear propagation resistance, test specimens were produced and tested as described for composition C-1. For determination of the strength of adhesive bond, lap shear strength (LSS) was determined on glass after storage of the composite specimens under standard climatic conditions for 14 d, as described for composition C1. As a measure of the heat and hydrolysis stability of the bond, further composite specimens were additionally stored in an air circulation oven at 90° C. for 7 days or at 70° C./100% relative humidity for 7 days, cooled down under standard climatic conditions and tested in the same way. The results are given the addition "14d SCC" or "7d 90° C." or "7d 70/100".

60% tensile stress (at 60% elongation) and 100% tensile stress (at 100% elongation) were determined with concrete test specimens (pretreated with Sika® Primer 3N, from Sika Schweiz) at 23° C. to DIN EN 28339, Method A.

The results are reported in table 3.

The examples labeled (Ref.) are comparative examples.

TABLE 3

Composition (in parts by weight) and properties of C-11 to C-14.

| Composition | C-11 | C-12 (Ref.) | C-13 (Ref.) | C-14 (Ref.) |
|---|---|---|---|---|
| Polymer P-2 | 25.00 | 25.00 | — | — |
| Polymer R-2 | — | — | 25.00 | 25.00 |
| Aldimine A1 | 0.90 | — | 1.0 | — |
| Thickener paste | 23.00 | 23.00 | 23.00 | 23.00 |
| Chalk[1] | 40.00 | 40.00 | 42.50 | 42.50 |
| Titanium dioxide | 5.00 | 5.00 | 5.00 | 5.00 |
| Diisodecyl phthalate | 4.00 | 6.40 | 1.40 | 3.90 |
| Epoxysilane[2] | 0.50 | 0.50 | 0.50 | 0.50 |
| Salicylic acid solution[3] | 1.50 | — | 1.50 | — |
| Dibutyltin dilaurate | 0.01 | 0.01 | 0.01 | 0.01 |
| p-Toluenesulfonyl isocyanate | 0.10 | 0.10 | 0.10 | 0.10 |
| Expression force [N] 7 d RT (3 mm nozzle) | 640 | 665 | 1111 | 1174 |
| | 815 | 1205 | 1930 | 1925 |
| 7 d 60° C. | | | | |
| Skin time [min] | 80 | 65 | 65 | 40 |
| Shore A 1d SCC | 30 | 35 | 36 | 49 |
| 2 d SCC | 37 | 40 | 45 | 52 |
| 7 d SCC | 38 | 42 | 46 | 53 |
| Tensile strength [MPa] | 1.62 | 1.57 | 1.86 | 1.80 |
| Elongation at break [%] | 620 | 560 | 530 | 380 |
| Modulus of elasticity 50% [MPa] | 1.13 | 1.46 | 1.69 | 2.16 |
| Tear propagation resistance [N/mm] | 7.1 | 7.2 | 7.4 | 7.6 |
| LSS [MPa] 14 d SCC | 0.84 | 0.94 | 1.12 | 1.19 |
| 7 d 90° C. | 0.98 | 0.94 | 1.15 | 1.29 |
| 7 d 70/100 | 0.84 | 0.94 | 1.05 | 1.19 |
| Tensile stress 60% [MPa] | 0.65 | 0.83 | 0.94 | 1.22 |
| 100% | 0.72 | 0.84 | 0.97 | tears |

[1]Omya BSH® - OM (from Omya)
[2]3-Glycidoxypropyltrimethoxysilane
[3]5% by weight of salicylic acid in dioctyl adipate Table 3 shows the properties of diphenylmethane 4,4-diisocyanate-based compositions that have rapid curing because of its high reactivity. The challenge here is nevertheless to achieve good storage stability and processability. The inventive composition C-11 (low monomeric diisocyanate content, aldimine A1) shows excellent storage stability coupled with very good processability (small rise in expression force after 7d 60° C. coupled with low expression force value), whereas reference compositions C-12 (low monomeric diisocyanate content, no blocked amine), C-13 (high monomeric diisocyanate content, aldimine A1) and C-14 (high monomeric diisocyanate content, no blocked amine) all show a large rise in expression force after storage at 60° C. for 7 days and hence distinctly worse storage stability.

The invention claimed is:

1. A method for producing a one-component moisture-curing composition, the method comprising:
   adding a blocked amine as a curing aid to polymers containing isocyanate groups and having a low monomeric diisocyanate content to form the one-component moisture-curing composition, the polymers containing isocyanate groups having been obtained from the reaction of at least one monomeric diisocyanate with at least one polyol in an NCO/OH ratio in a range of 4/1 to 7/1, followed by removal of a majority of the residual monomeric diisocyanates by a separation method,
   wherein
   the polymer containing isocyanate groups has a monomeric diisocyanate content of not more than 0.5% by weight, based on the polymer containing isocyanate groups after removal of the residual monomeric diisocyanates,
   the at least one monomeric diisocyanate is at least one of an isophorone diisocyanate and a diphenylmethane diisocyanate,
   the blocked amine includes at least one aldimino group or oxazolidino group, and
   a number of blocked amine groups in relation to a number of isocyanate groups present is in a range from 0.1 to 1.1.

2. The method as claimed in claim 1, wherein the monomeric diisocyanate content is not more than 0.3% by weight, based on the polymer containing isocyanate groups after removal of the residual monomeric diisocyanates.

3. The method as claimed in claim 1, wherein the polymer containing isocyanate groups has an NCO content in the range from 0.5% to 10% by weight.

4. The method as claimed in claim 1, wherein the polyol is a diol or triol having an OH number in the range from 8 to 185 mg KOH/g.

5. The method as claimed in claim 1, wherein the polyol is a polyether polyol and the polymer containing isocyanate groups that is obtained therefrom is a polyetherurethane polymer containing isocyanate groups.

6. The method as claimed in claim 1, wherein the blocked amine has at least one aldimino group of the formula (IIa) or (IIb)

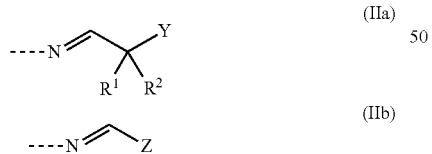

where $R^1$ and $R^2$ are each independently a monovalent hydrocarbyl radical having 1 to 12 carbon atoms, or together are a divalent hydrocarbyl radical having 4 to 12 carbon atoms which is part of an optionally substituted carbocyclic ring having 5 to 8 carbon atoms, Y is a monovalent organic radical having 1 to 25 carbon atoms, and Z is an optionally substituted aryl or heteroaryl radical having 5 to 26 carbon atoms.

7. The method as claimed in claim 1, wherein the blocked amine is selected from aldimines of the formula (IIIa), (IIIb) and (IIIc)

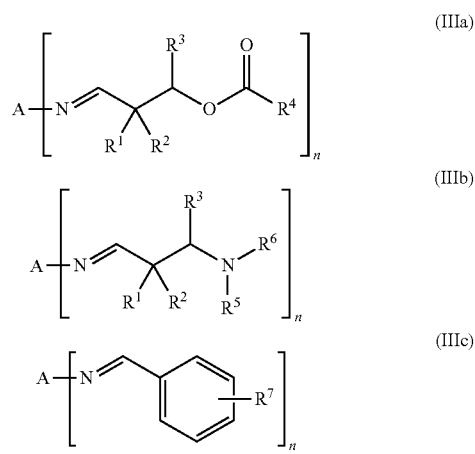

where n is 2 or 3, A is an n-valent aliphatic, cycloaliphatic or arylaliphatic hydrocarbyl radical optionally including ether oxygen and having a molecular weight in the range from 28 to 6000 g/mol, $R^3$ is a hydrogen radical or is a linear or branched alkyl, aralkyl or alkoxycarbonyl radical having 1 to 12 carbon atoms, $R^4$ is a hydrogen radical or a monovalent hydrocarbyl radical which has 1 to 18 carbon atoms and optionally contains ether, carbonyl or ester groups, $R^5$ and $R^6$ are each independently a linear or branched alkyl, cycloalkyl or aralkyl radical optionally having ether groups, or together are a divalent hydrocarbyl radical which has 4 to 12 carbon atoms and is part of a 5- to 8-membered heterocyclic ring which, in addition to the nitrogen atom, optionally contains an ether, thioether or tertiary amino group, and $R^7$ is a hydrogen radical or a linear or branched alkyl or alkoxy radical having 1 to 20 carbon atoms.

8. The method as claimed in claim 7, wherein $R^1$ and $R^2$ are each methyl, $R^3$ is a hydrogen radical, and either $R^4$ is a radical selected from methyl and undecyl, or $R^5$ and Re together are 3-oxa-1,5-pentylene, or $R^7$ is an optionally branched alkyl radical having 10 to 14 carbon atoms in the para position.

9. A moisture-curing polyurethane composition comprising:
   at least one polymer containing isocyanate groups and having a low monomeric diisocyanate content, the at least one polymer containing isocyanate groups having been obtained from the reaction of at least one monomeric diisocyanate with at least one polyol in an NCO/OH ratio in a range of 4/1 to 7/1, followed by removal of a majority of the residual monomeric diisocyanates by means of a separation method; and
   at least one blocked amine including at least one aldimino group or oxazolidino group,
   wherein
   the moisture-curing polyurethane composition has a monomeric diisocyanate content of less than 0.1% by weight, based on the overall composition,
   the at least one monomeric diisocyanate is at least one of an isophorone diisocyanate and a diphenylmethane diisocyanate,
   the moisture-curing polyurethane composition is a one-component moisture-curing composition, and
   a number of blocked amine groups in relation to a number of isocyanate groups present is in a range from 0.1 to 1.1.

10. The moisture-curing polyurethane composition as claimed in claim 9, further comprising at least one constituent selected from oligomeric isocyanates, catalysts, fillers and plasticizers.

11. A method of bonding or sealing, the method comprising the steps of:
(i) applying the moisture-curing polyurethane composition as claimed in claim 9 to a first substrate and contacting the composition with a second substrate within the open time of the composition, or to a first and to a second substrate and joining the two substrates within the open time of the composition, or between two substrates; and
(ii) curing the composition by contact with moisture.

12. A method of coating or sealing, the method comprising the steps of:
(i) applying the moisture-curing polyurethane composition as claimed in claim 9 to a substrate; and
(ii) curing the composition by contact with moisture.

13. An article obtained from the method as claimed in claim 11.

14. The method as claimed in claim 1, wherein the polyol is a polyether triol.

15. The method as claimed in claim 1, wherein the at least one monomeric diisocyanate is the isophorone diisocyanate.

16. The method as claimed in claim 15, wherein the isophorone diisocyanate is 1-isocyanato-3,3,5-trimethyl-5-isocyanatomethylcyclohexane.

17. The method as claimed in claim 1, wherein the at least one monomeric diisocyanate is the diphenylmethane diisocyanate.

18. The method as claimed in claim 17, wherein the diphenylmethane diisocyanate is 4,4'-diphenylmethane diisocyanate.

19. The method as claimed in claim 1, wherein the at least one polyol is an ethylene oxide-terminated triol.

20. The method as claimed in claim 1, wherein the number of blocked amine groups in relation to the number of isocyanate groups present is in a range from 0.2 to 1.0.

* * * * *